(12) United States Patent
Chang

(10) Patent No.: US 11,014,474 B2
(45) Date of Patent: May 25, 2021

(54) SEAT RECLINER FOR VEHICLE

(71) Applicant: HYUNDAI TRANSYS INCORPORATED, Seosan-si (KR)

(72) Inventor: Seung Hun Chang, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 123 days.

(21) Appl. No.: 16/392,982

(22) Filed: Apr. 24, 2019

(65) Prior Publication Data

US 2019/0337425 A1    Nov. 7, 2019

(30) Foreign Application Priority Data

May 2, 2018 (KR) .......................... 10-2018-0050422

(51) Int. Cl.
*B60N 2/22* (2006.01)
*B60N 2/235* (2006.01)

(52) U.S. Cl.
CPC ........... *B60N 2/2227* (2013.01); *B60N 2/236* (2015.04); *B60N 2/2362* (2015.04)

(58) Field of Classification Search
CPC .. B60N 2/2227; B60N 2/2356; B60N 2/2358; B60N 2/2362; B60N 2/236; B60N 2/22; B60N 2/20
See application file for complete search history.

(56) References Cited

U.S. PATENT DOCUMENTS

| | | |
|---|---|---|
| 5,984,413 A | 11/1999 | Baloche et al. |
| 6,454,354 B1 * | 9/2002 | Vossmann ............ B60N 2/2358 297/367 R |
| 7,648,204 B2 | 1/2010 | Oki |
| 7,703,852 B2 | 4/2010 | Wahls et al. |
| 8,038,218 B2 | 10/2011 | Wahls |
| 8,042,872 B2 | 10/2011 | Kim et al. |
| 8,430,454 B2 | 4/2013 | Tanguy et al. |
| 8,523,281 B2 | 9/2013 | Wahls |
| 8,720,999 B2 | 5/2014 | Peters |
| 8,864,234 B2 | 10/2014 | McCulloch et al. |
| 8,955,910 B2 | 2/2015 | Line et al. |
| 9,296,315 B2 | 3/2016 | Hellrung |

(Continued)

FOREIGN PATENT DOCUMENTS

| | | |
|---|---|---|
| DE | 10 2014 102 435 A1 | 8/2014 |
| JP | 2009-072416 A | 4/2009 |

(Continued)

OTHER PUBLICATIONS

U.S. Office Action dated Jul. 15, 2020 from the corresponding U.S. Appl. No. 16/381,211, 16 pp.

(Continued)

*Primary Examiner* — Milton Nelson, Jr.
(74) *Attorney, Agent, or Firm* — Brinks Gilson & Lione

(57) ABSTRACT

A seat recliner for a vehicle includes parts which are respectively used in opposite sides of a seat and compatible with each other. The seat recliner includes: a first flange having guide parts, guide spaces, and a first through hole; a plurality of lock gears having a guide protrusion; a lock cam having a second through hole; a control part having a third through hole and a guide slit; and a shaft penetrating through the first through hole, the second through hole, and the third through hole so that the shaft rotates with the lock cam and the control part.

10 Claims, 9 Drawing Sheets

(56) References Cited

U.S. PATENT DOCUMENTS

| | | |
|---|---|---|
| 10,093,201 B2 | 10/2018 | Auer et al. |
| 2010/0276976 A1* | 11/2010 | Kumazaki ............. B60N 2/236 297/354.12 |
| 2012/0169105 A1 | 7/2012 | Assmann et al. |
| 2012/0205956 A1 | 8/2012 | Nock et al. |
| 2013/0001997 A1 | 1/2013 | Gallienne et al. |
| 2013/0320735 A1 | 12/2013 | McCulloch et al. |
| 2014/0110984 A1 | 4/2014 | Assmann et al. |
| 2014/0132053 A1 | 5/2014 | Schuler et al. |
| 2014/0239691 A1 | 8/2014 | Hellrung |
| 2014/0239693 A1 | 8/2014 | Nock et al. |
| 2015/0008715 A1 | 1/2015 | Hur et al. |
| 2015/0069809 A1 | 3/2015 | Matt |
| 2015/0084392 A1 | 3/2015 | Chang |
| 2015/0321585 A1 | 11/2015 | McCulloch et al. |
| 2016/0023578 A1 | 1/2016 | Tame et al. |
| 2017/0341539 A1 | 11/2017 | Chang |
| 2017/0361736 A1 | 12/2017 | Chang |

FOREIGN PATENT DOCUMENTS

| | | |
|---|---|---|
| JP | 2013-070856 A | 4/2013 |
| KR | 10-2009-0099568 A | 9/2009 |
| KR | 10-2013-0054443 A | 5/2013 |
| KR | 10-2014-0001651 | 1/2014 |
| KR | 10-1453077 B1 | 10/2014 |
| KR | 10-1690041 B1 | 12/2016 |
| KR | 10-1725412 | 4/2017 |
| KR | 10-1746455 B1 | 6/2017 |
| KR | 10-1787990 B1 | 10/2017 |
| WO | 2012/038020 A1 | 3/2012 |

OTHER PUBLICATIONS

Korean Office Action dated May 28, 2019 from the corresponding Korean Application No. 10-2018-0050422, 7 pp.
Korean Office Action dated May 30, 2019 from the corresponding Korean Application No. 10-2018-0050423, 6 pp.
Korean Notice of Allowance dated Apr. 24, 2020 from the corresponding Korean Application No. 10-2018-0050422, 2 pp.
Korean Office Action dated Jun. 11, 2019 from the corresponding Korean Application No. 10-2018-0050424, 6 pp.
German Office Action dated Feb. 1, 2021 from the corresponding German Application No. 10 2019 205 879.5, 10 pp.

* cited by examiner

FIG. 1 "PRIOR ART"

SEAT RECLINER FOR VEHICLE

CROSS REFERENCE TO RELATED APPLICATION

The present application claims priority to and the benefit of Korean Patent Application No. 10-2018-0050422, filed May 2, 2018, the entire contents of which are incorporated herein by reference.

FIELD

The present disclosure relates generally to a seat recliner for a vehicle.

BACKGROUND

The statements in this section merely provide background information related to the present disclosure and may not constitute prior art.

Generally, in a vehicle seat, a recliner is provided between a seat cushion and a seat back, and when necessary, the recliner is released from a locked state for reclining, and is locked for maintaining a desired angle after reclining.

This seat recliner is generally configured such that a first flange is fixed, and a second flange is relatively rotated, with a lock gear provided in the recliner. When the lock gear is engaged with the second flange, the recliner is locked, and when the lock gear is released, the second flange is relatively rotated on the first flange so that the seat back is available to be reclined on the basis of the seat cushion. FIG. 1 is a perspective view showing the lock cam according to the related art.

Referring to FIG. 1, the conventional lock cam 100 is provided with an anti-misassembly protrusion 110 on an upper surface thereof. A control part (not shown) coupled to the upper surface of the lock cam 100 is provided on a lower surface thereof with a coupling groove (not shown), so the anti-misassembly protrusion 110 is inserted in the coupling groove and couples the lock cam 100 and the control part (not shown) together. The anti-misassembly protrusion 110 allows the control part (not shown) and the lock cam 100 to be coupled together only in a specified direction, thereby preventing from misassembling the control part and the lock cam 100.

However, we have discovered that due to the anti-misassembly protrusion 110 provided on the lock cam 100, the shapes of the lock cam 100 and the control part (not shown) become complicated, and the first flanges (not shown) that will be fixed on opposite sides of the seat cushion are required to be differently manufactured, thus causing problems in the related art seat recliner.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a seat recliner for a vehicle, in which parts used in opposite sides of a seat can be compatibly used regardless of left and right sides of the seat, but the parts used in the left and right sides of the seat are distinguishable from each other, and the parts can be simplified in shape and be inhibited or prevented from being misassembled.

In one aspect of the present disclosure, a seat recliner for a vehicle includes: a first flange including a plurality of guide parts disposed on an upper surface of the first flange, and a first through hole formed in a center portion of the first flange, wherein guide parts of the plurality of guide parts are spaced apart from each other along a circumferential direction of the first flange such that a plurality of guide spaces are defined between the guide parts; a plurality of lock gears configured to slide along the plurality of guide parts, respectively such that lower surfaces of the plurality of lock gears are seated on corresponding guide spaces of the plurality of guide spaces when assembled, wherein the plurality of lock gears respectively include a guide protrusion provided on an upper surface of the plurality of lock gears and a plurality of outer teeth provided on an outer end surface thereof; a lock cam disposed on the center portion of the first flange and configured to compress inner end surfaces of the plurality of lock gears as the lock cam is rotated so that the plurality of lock gears slide outward, the lock cam including a second through hole formed in a center portion of the lock cam; a control part disposed on the upper surfaces of the plurality of lock gears and the lock cam, where the control part includes a third through hole formed in a center portion of the control part, and a guide slit configured to receive and guide a guide protrusion of the plurality of lock gears; and a shaft configured to penetrate through the first through hole, the second through hole, and the third through hole, and configured to rotate along with the lock cam and the control part. In particular, a first locking structure is formed on an outer circumferential surface of the shaft, a second locking structure is formed on an inner circumferential surface of the lock cam defining the second hole, and a third locking structure is formed on the inner circumferential surface of the control part defining the third through hole, so that the shaft, the lock cam, and the control part are engaged with each other in a desired direction.

The second and the third through holes may have a polygonal shape, a cross-section of the shaft has the same polygonal shape as the shapes of the second and the third through holes so as to be inserted in the second and the third through holes.

The second through hole, the third through hole, and the shaft may respectively have the polygonal shape including chamfered edges. In particular, the first, second and third locking structures are respectively provided on the outer circumferential surface of the shaft, the inner circumferential surfaces of the lock cam, and the inner circumferential surface of the control part, which are corresponding to the chamfered edges of the polygonal shapes.

In one form, the second locking structure includes an insert protrusion protruding radially inward from the inner circumferential surface of the lock cam, the third locking structure includes another insert protrusion protruding radially inward from the inner circumferential surface of the control part, and the first locking structure includes insert grooves famed on the outer circumferential surface of the shaft such that the insert protrusions of the lock cam and the control part are inserted in the insert grooves of the shaft.

The first locking structure may include an insert protrusion protruding radially outward from the outer circumferential surface of the shaft. In another form, the second locking structure includes a first insert groove famed in the inner circumferential surface of the lock cam, and the third locking structure includes a second insert groove formed in the inner circumferential surface of the control part, such that the insert protrusion of the shaft is inserted into the first, and second insert grooves, respectively.

In another form, a number of the first, second and third locking structures of the shaft, the lock cam and the control part is less than a number of lock gears of the plurality of lock gears.

In other form, each of the first, second and third locking structures is provided in pair at positions opposite to each other with respect to a corresponding center of each of the lock cam, the control part, and the shaft.

The seat recliner may further include a spring, and the first flange may have a plurality of locking protrusions on a lower surface thereof. The spring may engage with a locking protrusion of the plurality of locking protrusions and provide torque to the lock gear and the control part in one direction.

The third through hole may be provided with a fastening part protruding radially inward along the inner circumferential surface of the center portion of the control part, and the shaft may be fastened to the fastening part in a state of being inserted in the third through hole.

The fastening part may have a tapered shape, and include: a lower end attached on the inner circumferential surface of the center portion of the control part, and an upper end. The fastening part becomes gradually narrower toward the upper end from the lower end, forming the tapered shape.

An outer diameter of the shaft may be configured larger than an inner diameter defined by the upper ends of a plurality of fastening parts, so that the shaft may be forcibly fitted in the fastening parts and be prevented from being removed in a reverse direction in a state of penetrating through the third through hole.

According to the seat recliner of the present disclosure, it is possible to simplify the shapes of the parts and prevent from misassembling the parts.

In addition, the parts used in the opposite sides of the seat can be compatibly used regardless of the left and right sides of the seat.

In addition, assembly of the parts can be easily realized and spacing between the assembled parts can be reduced or minimized.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
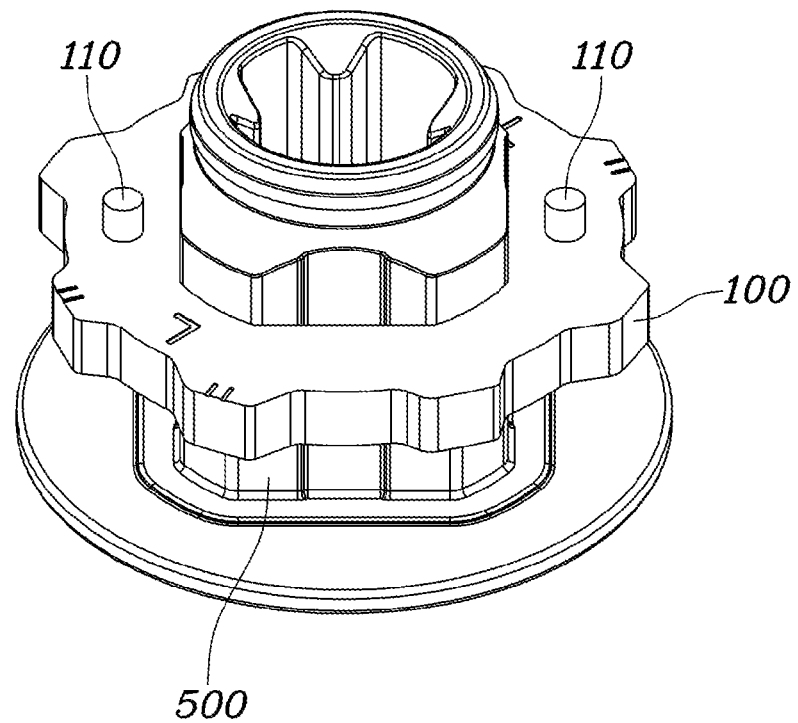
FIG. 1 is a perspective view showing a lock cam according to the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural and functional descriptions of forms of the present disclosure disclosed herein are only for illustrative purposes of the forms of the present disclosure. The present disclosure may be embodied in many different forms without departing from the spirit and significant characteristics of the present disclosure.

Reference will now be made in detail to various forms of the present disclosure, specific examples of which are illustrated in the accompanying drawings and described below, since the forms of the present disclosure can be variously modified in many different forms. While the present disclosure will be described in conjunction with exemplary forms thereof, it is to be understood that the present description is not intended to limit the present disclosure to those exemplary forms. On the contrary, the present disclosure is intended to cover not only the exemplary forms, but also various alternatives, modifications, equivalents and other forms that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing particular forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more features, integers, steps, operations, elements, components, and/or combinations thereof.

Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary forms of the present disclosure will be described in detail with reference to the accompanying drawings. Throughout the drawings, the same reference numerals will refer to the same or like parts.

Figure 2:
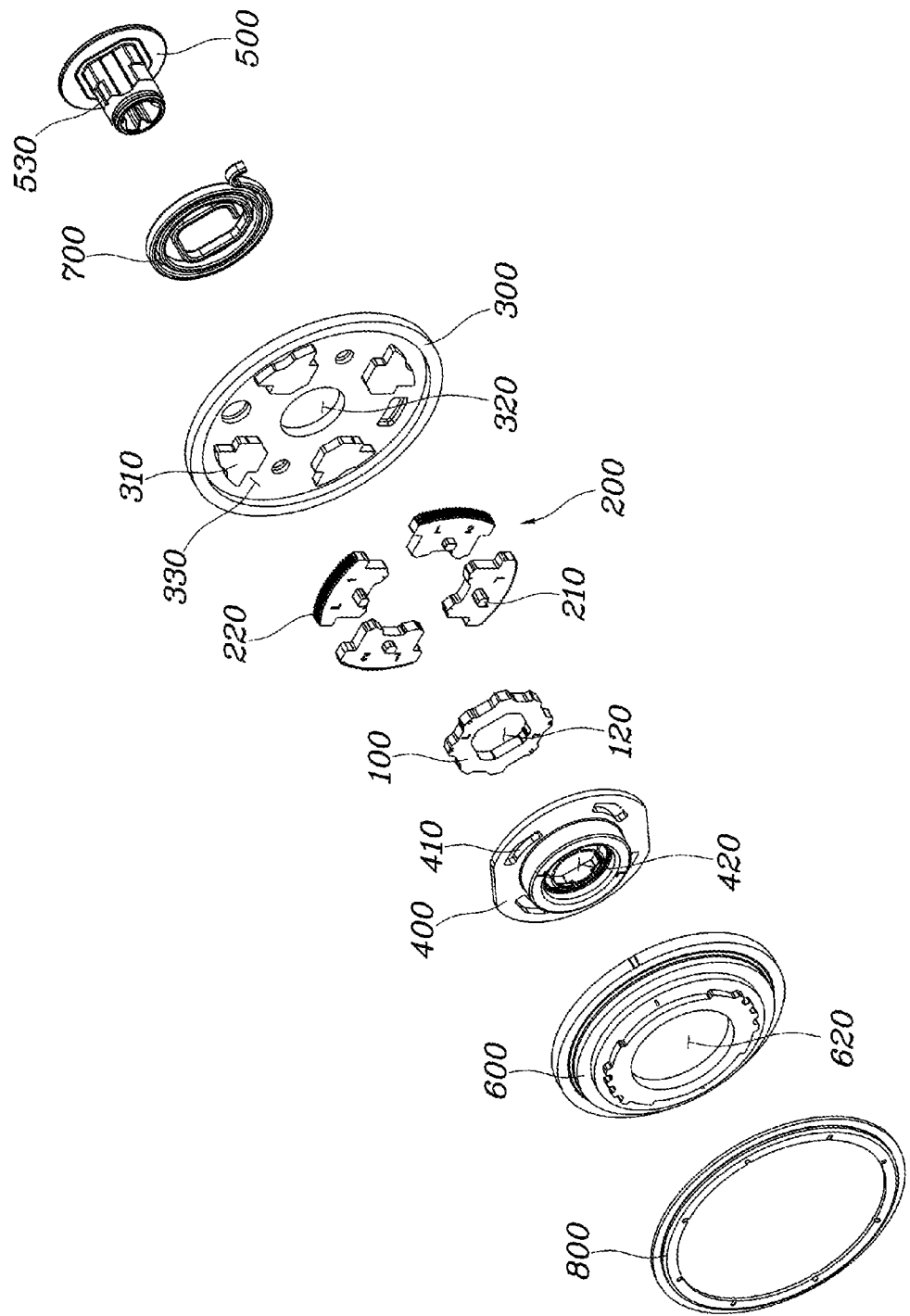
FIG. 2 is an exploded-perspective view showing a seat recliner for a vehicle according to one form of the present disclosure.
Figure 3:
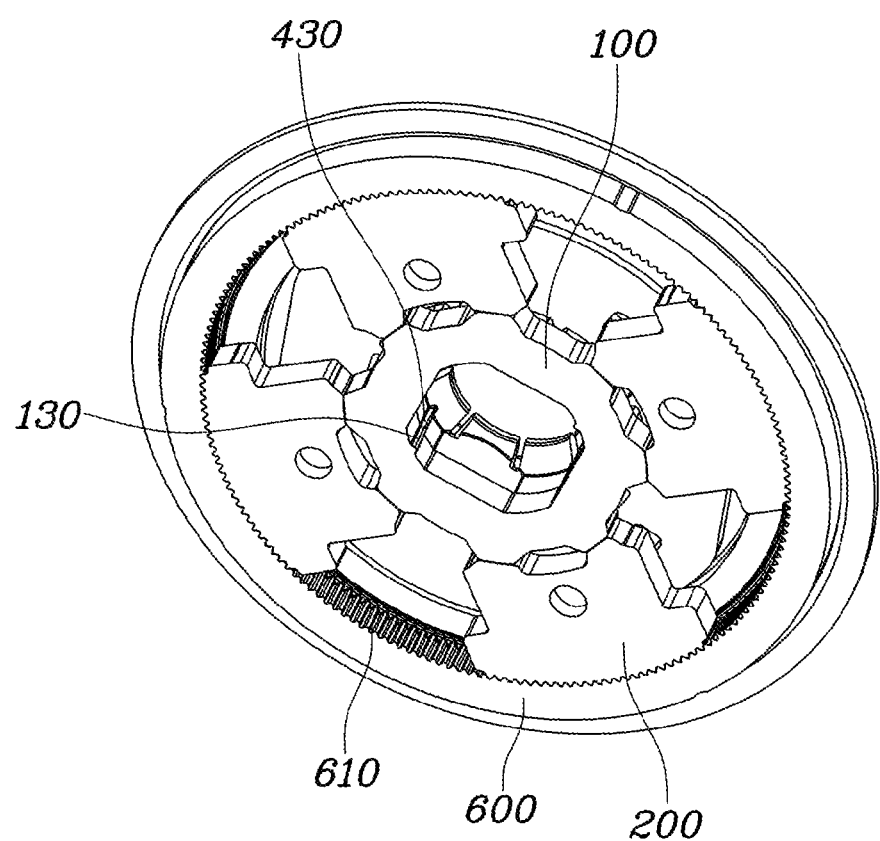
FIG. 3 is a perspective view showing a state in which the seat recliner for the vehicle is assembled according to one form of the present disclosure.
Figure 4A:
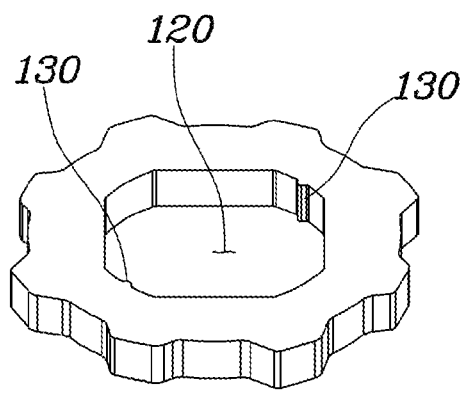
FIGS. 4A and 4B are exploded-perspective views respectively showing a lock cam and a control part according to one form of the present disclosure.
Figure 4B:
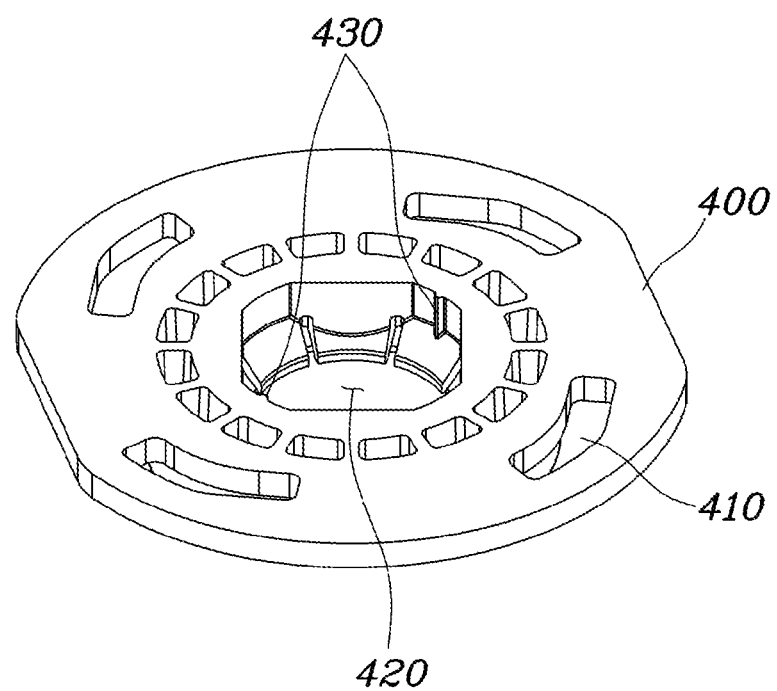

FIG. 2 is an exploded-perspective view showing a seat recliner for a vehicle according to one form of the present disclosure. FIG. 3 is a view showing a state in which the seat recliner for the vehicle is assembled according to the form of the present disclosure. FIGS. 4A and 4B are exploded-perspective views respectively showing a lock cam and a control part according to the form of the present disclosure.

Referring to FIGS. 2 to 4A and 4B, the seat recliner for the vehicle according to one form of the present disclosure may include: a first flange having a plurality of guide parts disposed on an upper surface of the first flange, and a first through hole formed in a center portion of the first flange, where the guide parts are spaced apart from each other along a circumferential direction of the first flange such that guide spaces 300 are defined between the guide parts; a plurality of lock gears 200 disposed on each guide space 330 of the first flange 300, and configured such that a lower surface thereof is seated on the guide space 330, a guide protrusion 210 is formed on an upper surface thereof, each of the lock gears 200 slides inward and outward along the guide part 310, and a plurality of outer teeth 220 is formed on an outer end surface thereof; a lock cam 100 disposed on the center of the first flange 300, compressing inner ends of the lock gear 200 as the lock cam is rotated, so that the lock gear 200 slides outward, and having a second through hole 120 formed in the center portion of the lock cam; a control part 400 disposed on upper surfaces of the plurality of the lock gears 200 and the lock cam 100, where the control part includes a third through hole 420 formed in the center portion of the control part, and a guide slit 410 through which the guide protrusion 210 of the lock gear 200 is inserted and guided; and a shaft 500 penetrating through the first through hole 320, the second through hole 120, and the third through hole 420 and rotated along with the lock cam 100 and the control part 400.

Particularly, the first flange 300 has the plurality of the guide parts 310 which are shaped into a protruding shape and spaced apart from each other in the circumferential direction of the first flange 300, and the guide space 330 is provided between each of the guide parts 310. The lock gear 200 is disposed on each guide space 330. The first through hole 320 is formed on the center of the first flange 300. The first through hole 320 may be shaped into a circle.

The lock gear 200 is disposed at each guide space 330 of the first flange 300, is configured such that the lower surface thereof is seated on the guide space 330, and slides inward and outward along the guide part 310. The outer teeth 220 are formed on the outer end of the lock gear 200, and the lock gear 200 slides inward and outward, so the outer teeth 220 of the lock gear 200 may be engaged with or be separated from inner teeth 610 formed on an inner end of the second flange 600 as will be described later herein. When the outer teeth 220 of the lock gear 200 are engaged with the inner teeth 610 of the second flange 600, relative rotation of the first flange 300 and the second flange 600 is locked so that a seat back and a seat cushion can be maintained at a desired angle.

The guide protrusion 210 is formed on the upper surface of the lock gear 200, and inserted in the guide slit 410 of the control part 400, so that the lock gear 200 is engaged with the control part 400 through the guide protrusion 210. Therefore, when the control part 400 is rotated, the guide protrusion 210 of the lock gear 200 moves along the guide slit 410, and as the lock gear 200 slides inward, teeth engagement between the lock gear 200 and the second flange 600 is released. In this case, when a fixed state between the first flange 300 and the second flange 600 is released, the angle between the seat back and the seat cushion can be relatively adjusted.

The lock cam 100 is disposed on the center of the first flange 300, and the lock gears 200 are disposed around an outer side of the lock cam 100. The lock cam 100 compresses the plurality of lock gears 200 so that the lock gears 200 slide outward, and when the lock cam 100 is rotated, the lock gears 200 slide inward. The second through hole 120 is formed on the center of the lock cam 100.

As shown in FIG. 1, the anti-misassembly protrusion 110 is formed on an upper surface of a lock cam 100 of the related art. The anti-misassembly protrusion 110 guides the lock cam 100 to be engaged with the groove formed on the control part 400 so that the lock cam 100 and the control part 400 are rotated only in a specified direction. However, in the present disclosure, the anti-misassembly protrusion 110 is removed to simplify the shape of the seat recliner, thus the present disclosure is improved in quality control and cost control.

The control part 400 is disposed on the upper surfaces of the plurality of the lock gears 200 and the lock cam 100, and covers all the upper surfaces of the lock cam 100 and the lock gears 200. The guide protrusion 210 of the lock gear 200 is inserted in the control part 400, and the guide slit 410 is provided to guide the guide protrusion 210 along a route when the control part 400 is rotated. The third through hole 420 is formed on the center of the control part 400.

The shaft 500 may penetrate through the first through hole 320 of the first flange 300, the second through hole 120 of the lock cam 100, and the third through hole 420 of the control part 400 in order. The shaft 500 may be rotated relative to the first flange 300, but is always rotated with the lock cam 100 and the control part 400.

Locking structures 130, 430 for engagement are respectively formed on inner circumferential surfaces of the lock cam and control part, respectively defining the second through hole 120 and the third through hole 420, and another locking structure 530 for engagement is formed on an outer circumferential surface of the shaft 500, so that the lock cam 100, the control part 400, and the shaft 500 are engaged with each other in a specified direction.

That is, in the seat recliner of the present disclosure, misassembly of the lock cam 100 and the control part 400 relative to the shaft 500 is prevented by the locking structures 130, 430, and 530 respectively formed on the sides of the inner circumferential surfaces of the second through hole 120 of the lock cam 100 and of the third through hole 420 of the control part 400, and on the side of the outer circumferential surface of the shaft 500. Further, misassembly of the shaft 500 relative to the lock cam 100 and the control part 400 in the seat recliner is prevented by the locking structures 130, 430, and 530 famed on the lock cam 100, the control part 400, and the shaft 500. Accordingly, the conventional anti-misassembly protrusion 110 formed on the upper surface of the lock cam 100 may be removed, so that the shape of the lock cam 100 may be simplified, thereby facilitating quality control and reducing the manufacturing cost.

Here, the second through hole 120 and the third through hole 420 may have a polygonal shape, and the shaft 500 inserted both into the second through hole 120 and the third through hole 420 may have a cross-section having the same polygonal shape as the shape of the second through hole 120 and the third through hole 420. Especially, the anti-misassembly protrusion 110 of the conventional lock cam 100 is engaged with the control part 400 and constrains rotation of the lock cam 100 relative to the control part 400. In order to allow the shaft 500 to perform this function in place of the conventional anti-misassembly protrusion 110, the present disclosure is configured such that the second through hole 120 and the third through hole 420 each have the polygonal shape and the shaft 500 has the same polygonal cross-section as the shape of each of the second through hole 120 and the third through hole 420. Thus, the shaft 500 is always rotated along with the lock cam 100 and the control part 400.

The second through hole 120 and the third through hole 420 may be shaped into a polygonal shape having the same number of edges as the number of the lock gear 200. In case of providing four lock gears 200 as illustrated in the form of the present disclosure, the second through hole 120 and the third through hole 420 may have a rectangular shape.

The second through hole 120, the third through hole 420, and the cross-section of the shaft 500 are shaped into the polygonal shape of which the edges are disposed toward each lock gear 200, and the edges may be chamfer edges. The locking structures 130, 430, and 530, which are formed on the sides of the inner circumferential surfaces of the second through hole 120 and the third through hole 420, and on the side of outer circumferential surface of the shaft 500, respectively, may be formed on the chamfer edges of the polygonal shapes.

Accordingly, parts used in a right side and a left side of the seat recliner may be compatibly used regardless of the left and right sides of the seat recliner, and it is possible to simplify the parts and prevent the parts from being misassembled.

The first through hole 320 may have a circular shape to allow the first flange 300 to be freely rotated in a state in which the shaft 500 is inserted, so that the first flange 300 is rotated relative to the lock cam 100, the control part 400, and the shaft 500.

As shown in FIGS. 2 to 4A and 4B, the locking structures 130, 430, and 530 may be respectively famed on the inner circumferential surfaces of the lock cam 100 defining the second through hole 120, on the inner circumferential surface of the control part 400 defining the third through hole 420, and on the outer circumferential surface of the shaft 500. In one form, the locking structures 130, 430 may be insert protrusions 130 and 430, which are respectively protruded radially inward from the inner circumferential surfaces of the lock cam 100 and the control part 400, and the other locking structure 530 may be insert grooves 530 formed on the outer circumferential surface of the shaft 500 so that the insert protrusions 130 and 430 of the lock cam 100 and the control part 400 are inserted in the insert grooves 530.

That is, the insert protrusion 130 protrudes radially inward from a side of an inner circumferential surface of the second through hole 120 formed on the lock cam 100. The insert protrusion 430 protrudes radially inward from a side of an inner circumferential surface of the third through hole 420 formed on the control part 400. Thus, the insert protrusions 130 and 430 may guide the lock cam 100 and the control part 400 to be engaged with the shaft 500 in the specified direction. In addition, it is possible to prevent from misassembling parts (e.g., inhibiting from assembling the lock cam 100 and the control part 400 in an incorrect direction).

In addition, the insert groove 530 is formed on the outer circumferential surface of the shaft 500 and in which the insert protrusions 130 and 430 of the second through hole 120 and the third through hole 420 are inserted, and the shaft 500 may be inserted through the lock cam 100 and the control part 400 only in a preset specified direction. Additionally, an insert protrusion (not shown) may be also formed on the first through hole 320 of the first flange 300, and may guide the first flange 300 to be engaged with the lock cam 100 in a specified direction.

Figure 5:
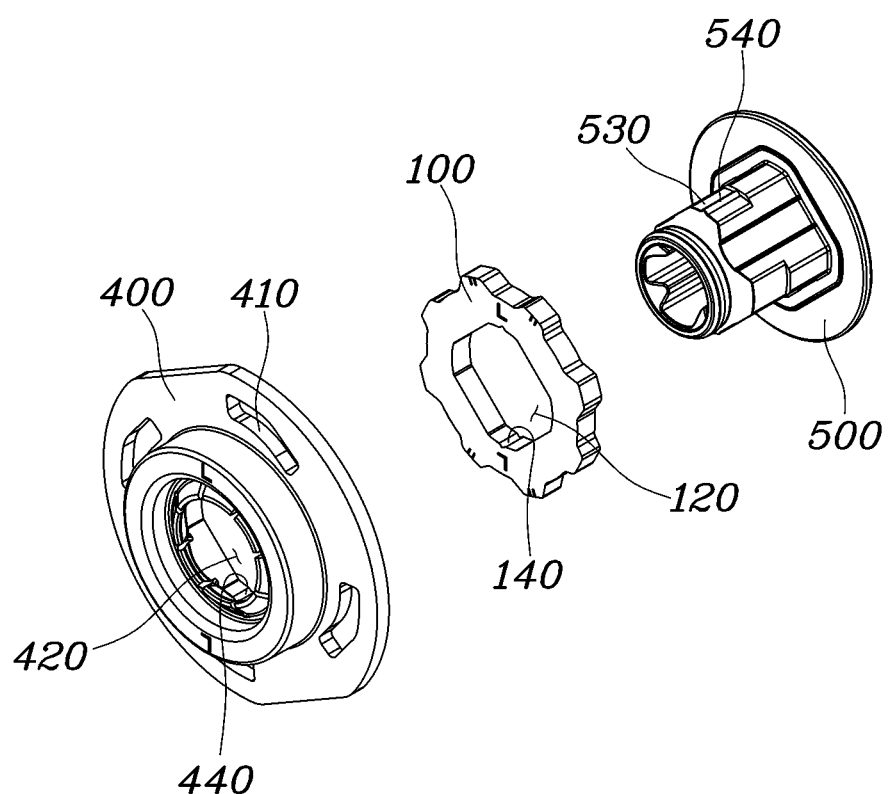
FIG. 5 is an exploded-perspective view showing a seat recliner for a vehicle according to another form of the present disclosure.

FIG. 5 is an exploded-perspective view showing a seat recliner for a vehicle according to another form of the present disclosure. As shown in FIG. 5, in another form, contrary to the accompanying drawings, an insert protrusion (not shown) may protrude radially outward from the outer circumferential surface of the shaft 500, and insert grooves (140,440) in which the insert protrusion (540) of the shaft 500 is inserted may be respectively formed on the the second through hole 120, and the third through hole 420. That is, the shaft 500 may have the insert protrusion (540), and the second through hole 120 of the lock cam 100 and the third through hole 420 of the control part 400 may have the respective insert grooves (140,440). However, in this form, the first through hole 320 of the first flange 300 may also have an insert groove (not shown).

The number of the locking structures 130, 430, and 530, provided on the sides of the inner circumferential surfaces of the second through hole 120 and the third through hole 420, and on the side of the outer circumferential surface of the shaft 500, may be less than the number of entire lock gears 200. The lock cam 100 may have the polygonal shape having edges corresponding to the number of entire lock gears 200. When the number of the locking structures 130, 430, and 530 is the same as the number of entire lock gears 200, the purpose and effect such as prevention of misassembly cannot be achieved. Accordingly, the number of the locking structures 130, 430, and 530 should be at least one, and be less than the number of entire lock gears 200.

The locking structures 130, 430, and 530 formed on the sides of the inner circumferential surfaces of the second through hole 120 and the third through hole 420, and on the side of the outer circumferential surface of the shaft 500 may be provided in one pair at positions opposite to each other on the basis of the center of the lock cam 100, the control part 400, or the shaft 500, respectively. That is, each pair of the locking structures 130, 430, and 530 may be formed at the opposite positions on the basis of the center of each of the lock cam 100, the control part 400, and the shaft 500. Accordingly, engagement of the parts realized by the locking structures 130, 430, and 530 may be stable, and torque transmission from the control part 400 and the lock cam 100 via the shaft 500 may be stable so that the parts may be improved in durability and operability.

Figure 6A:
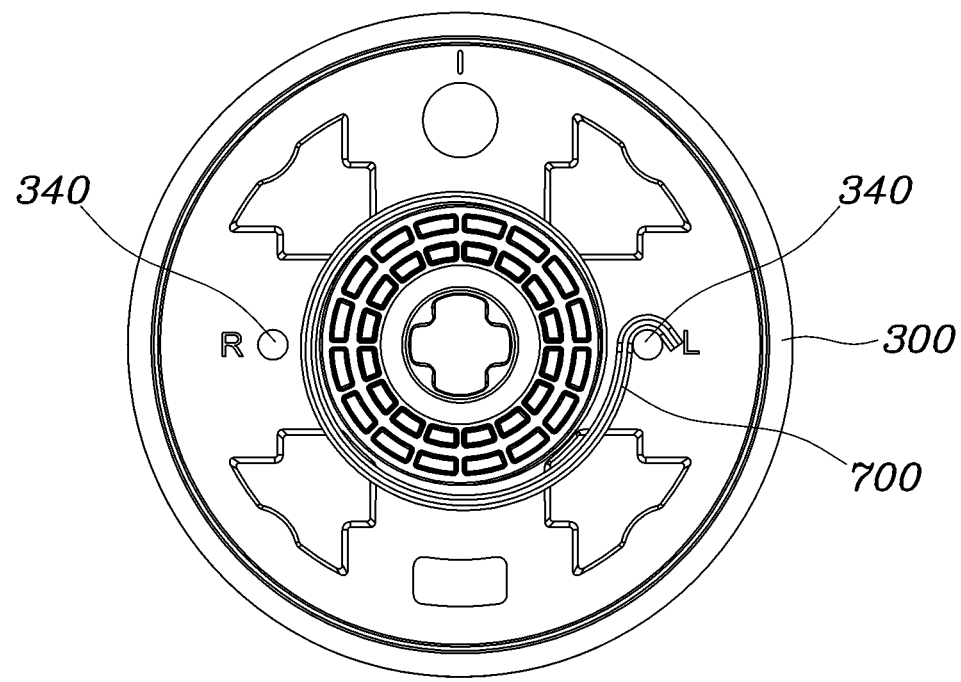
FIGS. 6A and 6B are views showing a lower surface of a first flange according to exemplary forms of the present disclosure.
Figure 6B:
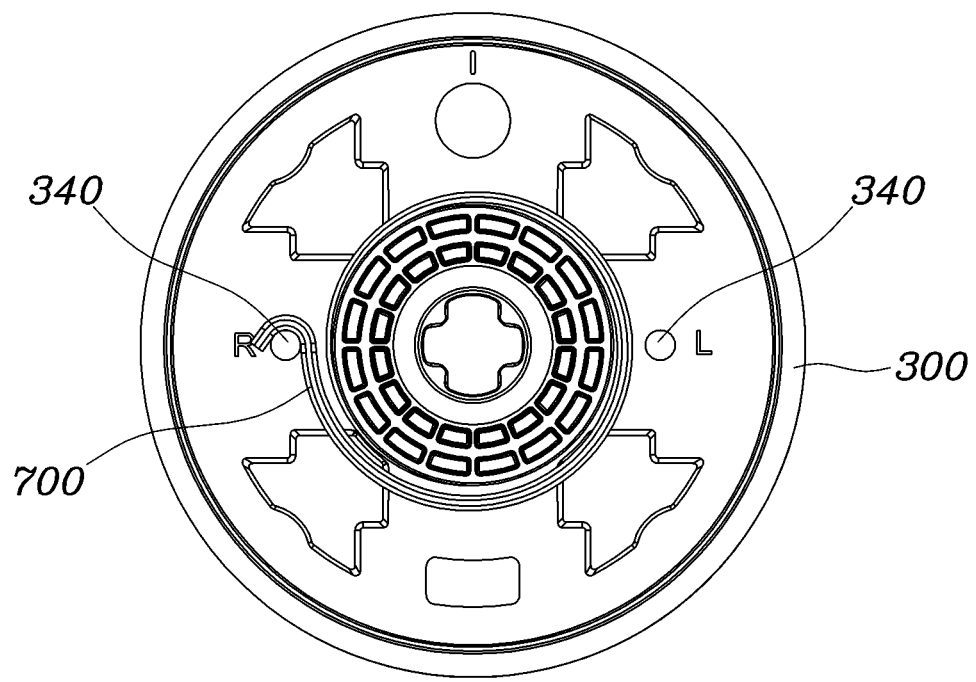

FIGS. 6A and 6B are views showing the lower surface of the first flange 300 according to one form of the present disclosure.

Referring to FIGS. 6A and 6B, the first flange 300 is provided with a plurality of locking protrusions 340 on the lower surface thereof. The seat recliner may further include a spring 700, and the spring 700 is engaged with any one of the locking protrusions 340 of the first flange 300, thereby providing torque to the lock gear 200 and the control part 400 in one direction.

In the related art, first flanges 300 coupled to the right side and the left side of the seat recliner are differently manufactured. This is intended to prevent a seat bracket (not shown) assembled at a lower surface side of each of the first flanges 300 from being misassembled.

However, in the form of the present disclosure, the locking protrusions 340 are provided on the lower surface of the first flange 300 while being separated into one coupled to the left side of the seat recliner and the other coupled to the right side thereof, as shown in the drawings. In addition, as the spring 700 is engaged with relevant locking protrusion 340, when the seat bracket (not shown) is assembled on the lower surface side of the first flange 300, it is possible to distinguish the seat bracket (not shown) provided on the left side of the seat and the seat bracket (not shown) provided on the right side of the seat.

That is, a plurality of locking protrusions 340 is separately marked as the left side and the right side of the seat recliner, and the spring 700 is engaged with the relevant locking protrusion 340. Consequentially, the first flange 300 and the shaft 500 may be compatibly used in the left side of the seat and the right side thereof, and assembled seat brackets (not shown) may be distinguished, so that misassembly of the seat bracket (not shown) can be prevented.

Referring to FIG. 2 again, the seat recliner of the present disclosure may further include the second flange 600, which is coupled to be rotatable relative to the first flange 300, covers the lock gear 200 and the control part 400, and has the inner teeth 610 engaged with the outer teeth 220 of the lock gear 200 on the inner end thereof. The second flange 600 is shaped to cover the lock gear 200 and the control part 400, and is coupled to the first flange 300 to be rotatable relative to the first flange 300. The inner teeth 610 are formed on the inner end of the second flange 600, and as the lock gear 200 slides outward, the outer teeth 220 of the lock gear 200 and the inner teeth 610 of the second flange 600 are engaged with each other. Accordingly, relative rotation between the first flange 300 and the second flange 600 is locked, or as the lock gear 200 slides inward, teeth engagement between the outer teeth 220 of the lock gear 200 and the inner teeth 610 of the second flange 600 is released and relative rotation between the first flange 300 and the second flange 600 may be available.

The second flange 600 covers an upper surface of the control part 40, and then a retainer 800 is coupled to an upper part of the second flange 600, so that entire assembly is finished.

Figure 7A:
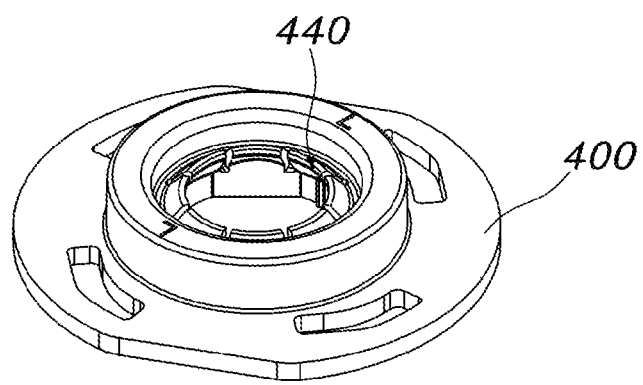
FIGS. 7A and 7B are exploded-perspective views respectively showing a first flange and a control part which are assembled according to one form of the present disclosure.
Figure 7B:
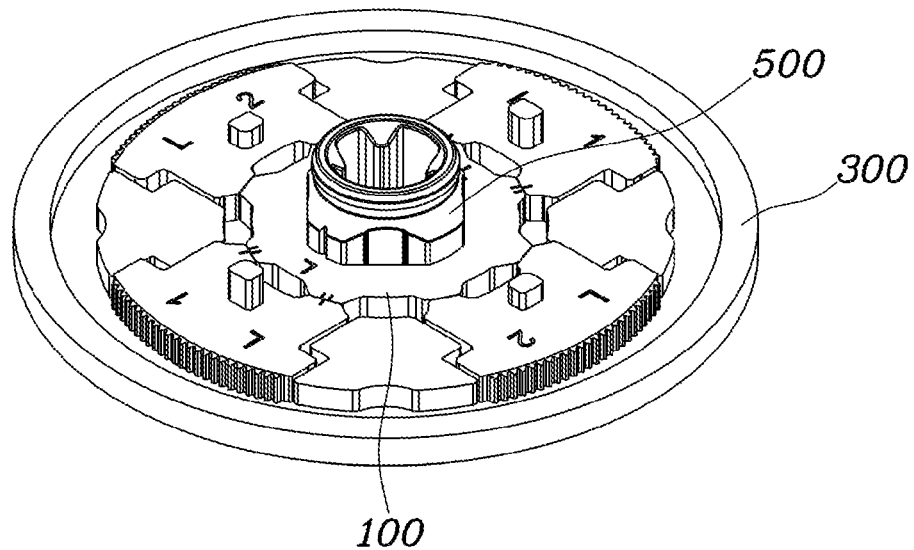
Figure 8:
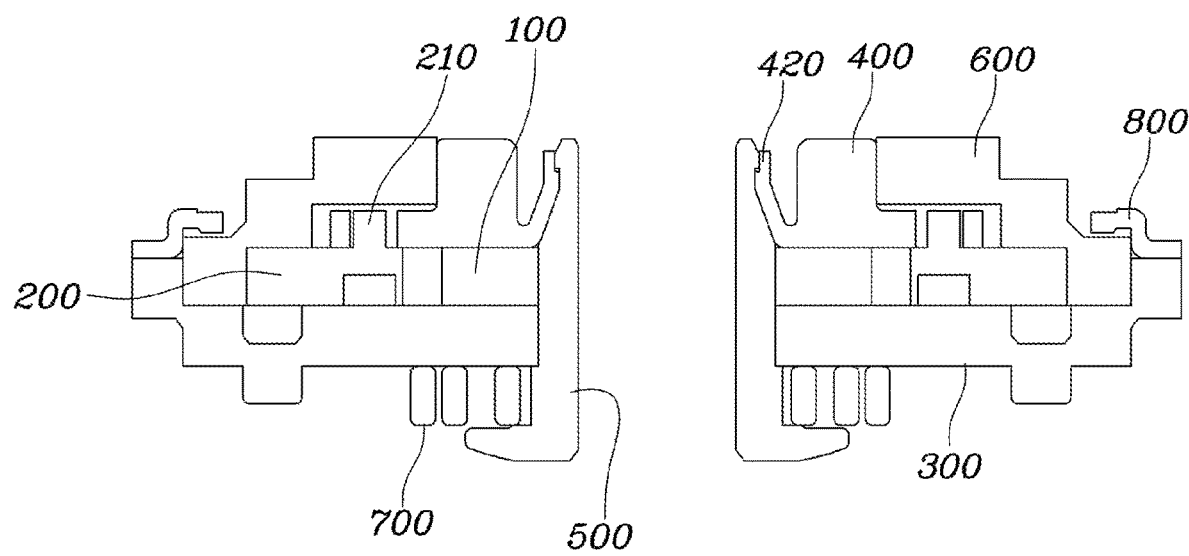
FIG. 8 is a cross-section view showing the seat recliner for the vehicle according to one form of the present disclosure.

FIGS. 7A and 7B are exploded-perspective views respectively showing the first flange 300 and the control part 400 which are assembled according to the form of the present disclosure. FIG. 8 is a cross-section view showing the seat recliner for the vehicle according to the form of the present disclosure.

Referring to FIGS. 7A, 7B and 8, the seat recliner is provided with a fastening part 440 protruding radially inward along the inner circumferential surface of the center portion of the control part defining the third through hole 420, and the shaft 500 may be locked to the fastening part 440 in a state of being inserted in the third through hole 420.

The fastening part 440 is shaped into a tapered shape so that a lower end thereof is locked on the inner circumferential surface of the third through hole 420, and an upper end thereof is tapered inward. That is, the fastening part 440 has the tapered shape that is gradually tapered from a lower end of the fastening part to an upper end thereof such as a funnel. The lower end is locked on the inner circumferential surface of the third through hole 420, and the upper end is a free end and may have elasticity to transform the shape thereof.

As an outer diameter of the shaft 500 is formed larger than an inner diameter defined by the upper end of the fastening part 440, the shaft 500 is forcibly fitted in the fastening part 440 and is prevented from being removed in a reverse direction in a state of penetrating through the third through hole 420.

In addition, the shaft 500 is provided with a stopping step (not shown) on the outer diameter, and the fastening part 440 is provided with a stopping protrusion (not shown) on the upper end. In this case, when the shaft 500 is inserted into the fastening part 440, it is possible to prevent the shaft 500 from being removed in the reverse direction in the state of penetrating through the third through hole 420.

Consequentially, the shaft 500 may be inserted from the lower surface of the first flange 300 through the first through hole 320, penetrate through the second through hole 120 of the lock cam 100, and then be fastened to the fastening part 440 while penetrating through the third through hole 420 of the control part 400. A position of the lock cam 100 may be fixed between the control part 400 and the first flange 300 by the shaft 500, and for this purpose, an additional configuration such as a fixing ring is unnecessary. That is, it is possible to assemble the lock gear 200 and the lock cam 100 with only existing the control part 400 and the shaft 500, without adding any separate device for assembling the control part 400, the lock gear 200, and the lock cam 100 together.

Although exemplary forms of the present disclosure have been described for illustrative purposes, those skilled in the art will appreciate that various modifications, additions and substitutions are possible, without departing from the scope and spirit of the present disclosure.

What is claimed is:

1. A seat recliner for a vehicle, the seat recliner comprising:
a first flange including a plurality of guide parts disposed on an upper surface of the first flange, and a first through hole formed in a center portion of the first flange, wherein guide parts of the plurality of guide parts are spaced apart from each other along a circumferential direction of the first flange such that a plurality of guide spaces are defined between the guide parts of the plurality of guide parts;
a plurality of lock gears configured to slide along the plurality of guide parts, respectively such that lower surfaces of the plurality of lock gears are seated on corresponding guide spaces of the plurality of guide spaces when assembled, wherein the plurality of lock gears respectively include a guide protrusion provided on an upper surface of the plurality of lock gears and a plurality of outer teeth provided on an outer end surface thereof;
a lock cam disposed on the center portion of the first flange, and configured to compress inner end surfaces of the plurality of lock gears as the lock cam is rotated so that the plurality of lock gears slide outward, the lock cam including a second through hole formed in a center portion of the lock cam;
a control part disposed on the upper surfaces of the plurality of lock gears and the lock cam, and including:
a third through hole formed in a center portion of the control part, and
a guide slit configured to receive and guide a guide protrusion of the plurality of lock gears; and
a shaft configured to penetrate through the first through hole, the second through hole, and the third through hole, and configured to rotate along with the lock cam and the control part,
wherein a first locking structure is formed on an outer circumferential surface of the shaft, a second locking structure is formed on an inner circumferential surface of the lock cam defining the second hole, and a third locking structure is formed on the inner circumferential surface of the control part defining the third through hole, so that the shaft, the lock cam, and the control part are engaged with each other in a desired direction, and
wherein the third through hole is provided with at least one fastening part protruding radially inward along an inner circumferential surface of the center portion of the control part, and the shaft is fastened to the at least one fastening part in a state of being inserted in the third through hole.

2. The seat recliner for the vehicle of claim 1, wherein the second and the third through holes have a polygonal shape, a cross-section of the shaft has the same polygonal shape as the shapes of the second and the third through holes so as to be inserted in the second and the third through holes.

3. The seat recliner for the vehicle of claim 2, wherein the second through hole, the third through hole, and the shaft respectively have the polygonal shape including chamfered edges, and
wherein the first, second and third locking structures are respectively provided on the outer circumferential surface of the shaft, the inner circumferential surfaces of the lock cam, and the inner circumferential surface of the control part, which are corresponding to the chamfered edges of the polygonal shapes.

4. The seat recliner for the vehicle of claim 1, wherein the second locking structure includes an insert protrusion protruding radially inward from the inner circumferential surface of the lock cam, the third locking structure includes another insert protrusion protruding radially inward from the inner circumferential surface of the control part, and the first locking structure includes insert grooves formed on the outer circumferential surface of the shaft such that the insert protrusions of the lock cam and the control part are inserted in the insert grooves of the shaft.

5. The seat recliner for the vehicle of claim 1, wherein the first locking structure includes an insert protrusion protruding radially outward from the outer circumferential surface of the shaft, and
wherein the second locking structure includes a first insert groove formed in the inner circumferential surface of the lock cam, and the third locking structure includes a second insert groove formed in the inner circumferential surface of the control part, such that the insert protrusion of the shaft is inserted into the first, and second insert grooves, respectively.

6. The seat recliner for the vehicle of claim 1, wherein:
a number of the first locking structures of the shaft is less than a number of lock gears of the plurality of lock gears,
a number of the second locking structures of the lock cam is less than the number of lock gears of the plurality of lock gears, and
a number of the third locking structures of the control part cam is less than the number of lock gears of the plurality of lock gears.

7. The seat recliner for the vehicle of claim 1, wherein the at least one fastening part has a tapered shape, and includes:
a lower end attached on the inner circumferential surface of the center portion of the control part, and
an upper end, wherein the at least one fastening part becomes gradually narrower toward the upper end from the lower end.

8. The seat recliner for the vehicle of claim 7, wherein the at least one fastening part includes a plurality of fastening parts, and wherein an outer diameter of the shaft is greater than an inner diameter defined by upper ends of fastening parts of the plurality of fastening parts, so that the shaft is forcibly fitted in the fastening parts and is inhibited from being removed in a reverse direction in a state of penetrating through the third through hole.

9. A seat recliner for a vehicle, the seat recliner comprising:
a first flange including a plurality of guide parts disposed on an upper surface of the first flange, and a first through hole formed in a center portion of the first flange, wherein guide parts of the plurality of guide parts are spaced apart from each other along a circumferential direction of the first flange such that a plurality of guide spaces are defined between the guide parts of the plurality of guide parts;
a plurality of lock gears configured to slide along the plurality of guide parts, respectively such that lower surfaces of the plurality of lock gears are seated on corresponding guide spaces of the plurality of guide spaces when assembled, wherein the plurality of lock gears respectively include a guide protrusion provided on an upper surface of the plurality of lock gears and a plurality of outer teeth provided on an outer end surface thereof;
a lock cam disposed on the center portion of the first flange, and configured to compress inner end surfaces of the plurality of lock gears as the lock cam is rotated so that the plurality of lock gears slide outward, the lock cam including a second through hole formed in a center portion of the lock cam;
a control part disposed on the upper surfaces of the plurality of lock gears and the lock cam, and including:
a third through hole formed in a center portion of the control part, and
a guide slit configured to receive and guide a guide protrusion of the plurality of lock gears; and
a shaft configured to penetrate through the first through hole, the second through hole, and the third through hole, and configured to rotate along with the lock cam and the control part,
wherein a pair of first locking structures is formed on an outer circumferential surface of the shaft, a pair of second locking structures is formed on an inner circumferential surface of the lock cam defining the second hole, and a pair of third locking structures is formed on the inner circumferential surface of the control part defining the third through hole, so that the shaft, the lock cam, and the control part are engaged with each other in a desired direction,
wherein the third through hole is provided with at least one fastening part protruding radially inward along an inner circumferential surface of the center portion of the control part, and the shaft is fastened to the at least one fastening part in a state of being inserted in the third through hole, and wherein:
first locking structures of the pair of first locking structures are provided at positions facing to each other across a center of the shaft,
second locking structures of the pair of second locking structures are provided at positions facing to each other across a center of the lock cam, and
third locking structures of the pair of third locking structures are provided at positions facing to each other across a center of the control part.

10. The seat recliner for the vehicle of claim 1, further comprising a spring,
wherein the first flange includes a plurality of locking protrusions on a lower surface thereof, and the spring is configured to engage with a locking protrusion of the plurality of locking protrusions and configured to provide torque to the lock gear and the control part in one direction.

\* \* \* \* \*